(12) United States Patent
Zeng et al.

(10) Patent No.: US 9,710,440 B2
(45) Date of Patent: Jul. 18, 2017

(54) PRESENTING FIXED FORMAT DOCUMENTS IN REFLOWED FORMAT

(71) Applicant: Microsoft Corporation, Redmond, WA (US)

(72) Inventors: Wei Zeng, Sammamish, WA (US); Seth Robert Atkinson, Redmond, WA (US); Raman Narayanan, Seattle, WA (US); Ming Liu, Bellevue, WA (US); Aleksandr Gil, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1002 days.

(21) Appl. No.: 13/972,786

(22) Filed: Aug. 21, 2013

(65) Prior Publication Data
US 2015/0058711 A1 Feb. 26, 2015

(51) Int. Cl.
G06F 17/00 (2006.01)
G06F 17/22 (2006.01)
G06F 17/30 (2006.01)
G06F 3/0488 (2013.01)
G06F 17/21 (2006.01)

(52) U.S. Cl.
CPC ...... *G06F 17/2247* (2013.01); *G06F 3/04883* (2013.01); *G06F 3/04886* (2013.01); *G06F 17/212* (2013.01); *G06F 17/30905* (2013.01)

(58) Field of Classification Search
CPC .................................................. G06F 3/0488
USPC ............... 715/234, 230, 200, 243, 252, 247
See application file for complete search history.

(56) References Cited

U.S. PATENT DOCUMENTS

| 5,978,819 | A  | * | 11/1999 | Berstis ................. G06F 17/211 715/205 |
| 6,560,616 | B1 | * | 5/2003 | Garber ................. G06F 17/211 |
| 6,891,551 | B2 | * | 5/2005 | Keely ................... G06F 3/0481 715/762 |
| 7,433,548 | B2 |   | 10/2008 | Goodwin et al. |
| 7,616,815 | B2 | * | 11/2009 | Berkner ............ G06F 17/30905 382/176 |
| 8,413,048 | B1 | * | 4/2013 | Goodwin .............. G06F 17/211 715/243 |
| 8,515,176 | B1 |   | 8/2013 | Sankaranarayanan et al. |
| 8,572,480 | B1 | * | 10/2013 | Goodwin .............. G06F 17/212 382/173 |
| 8,855,413 | B2 | * | 10/2014 | Tang ........................ G06K 9/00 382/165 |

(Continued)

FOREIGN PATENT DOCUMENTS

EP 897157 A2 2/1999

OTHER PUBLICATIONS

"GoodReader User Manual", Retrieved at: <<http://www.goodiware.com/gr-man-view-pdf.html#reflow>>, Sep. 25, 2009, pp. 11.

(Continued)

*Primary Examiner* — Manglesh M Patel
(74) *Attorney, Agent, or Firm* — Turk IP Law, LLC

(57) ABSTRACT

A reader application presents fixed format documents in reflowed format. A selection control is presented to display a reflow view after identifying text-based sections within a displayed content. The reflow view is generated using the sections upon an action on the selection control to display the reflow view. The reflow view is displayed in a location associated with the section within the displayed content or in place of the displayed content The reflow view is adjusted based on a screen size of the reader application.

20 Claims, 7 Drawing Sheets

(56) References Cited

U.S. PATENT DOCUMENTS

| | | | | |
|---|---|---|---|---|
| 9,218,123 | B2* | 12/2015 | Khandker | G06F 3/0485 |
| 2003/0014445 | A1* | 1/2003 | Formanek | G06F 17/211 |
| | | | | 715/247 |
| 2010/0251104 | A1 | 9/2010 | Massand | |
| 2011/0173532 | A1* | 7/2011 | Forman | G06F 17/211 |
| | | | | 715/256 |
| 2012/0128249 | A1 | 5/2012 | Panjwani et al. | |
| 2012/0288190 | A1 | 11/2012 | Tang | |
| 2014/0006934 | A1* | 1/2014 | Wang | G06F 17/30905 |
| | | | | 715/235 |

OTHER PUBLICATIONS

"Reflow a PDF", Retrieved at: <<http://help.adobe.com/en_US/acrobat/X/pro/using/WS58a04a822e3e50102bd615109794195ff-7d19.w.html#>>, Retrieved on: Jun. 5, 2013, p. 1.

"EPUB 3 Fixed-Layout Documents", Retrieved at: <<http://www.idpf.org/epub/fxl/>>, Mar. 24, 2012, pp. 23.

"QPDF Viewer", Retrieved at: <<https://play.google.com/store/apps/details?id=com.qoppa.activities.viewer>>, Apr. 4, 2013, pp. 2.

"APABI Reader", Retrieved at: <<https://itunes.apple.com/in/app/apabi-reader/id377594275?mt=8>>, Retrieved on: Jun. 5, 2013, pp. 2.

"International Preliminary Report on Patentability Issued in PCT Patent Application No. PCT/US2014/051567", Mailed Date: Oct. 28, 2015, 10 Pages.

"Second Written Opinion Issued in PCT Application No. PCT/US2014/051567", Mailed Date: Jul. 24, 2015, 9 Pages.

"Dana User's Guide", Published on: Jan. 1, 2003, Available at: http://web.archive.org/web/20060824022821/www.alphasmart.com/pdf/dana_user_guide.pdf.

"International Search Report and Written Opinion Issued in PCT Patent Application No. PCT/US2014/051567", Mailed Date: Dec. 11, 2014, 13 Pages.

\* cited by examiner

PRESENTING FIXED FORMAT DOCUMENTS IN REFLOWED FORMAT

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as hand-held computers, smart phones, tablet devices, and comparable devices have become common. Such devices execute a wide variety of applications ranging from communication applications to complicated analysis tools. Many such applications render visual effects through a display and enable users to provide input associated with the applications' operations.

Recently, devices of limited display size have penetrated the customer markets successfully. In some instances, limited purpose devices such as tablets have replaced multi-purpose devices such as laptops for use in media consumption. Another consumer consumption pattern shifting towards limited purpose devices includes consumption of fixed format documents. Fixed format documents assemble content to resemble paper productions. Such documents provide a familiar format to the user. In addition, added features such as text search and page scrolling improve on user interactivity compared to traditional sources of media such as paper productions. However, applications presenting fixed format documents are unable to re-assemble the contents of the documents to match the display size limitations of devices presenting the documents. Display size limitations may inconvenience users by displaying small portions of the fixed format documents and forcing users to scroll endlessly to reach desired content. Zoom in and out functions seldom resolve display size limitations because font size becomes unreadable if using zoom out beyond an eye's resolution limit.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to presenting fixed format documents in reflowed format. According to some embodiments, a document reader application may identify at least one section of a displayed content having text. The sections may include, for example, title and body segments. A selection control may be presented to display a reflow view of the sections. The selection control may be session aware and persist its state during a session associated with the displayed content.

Next, the reader application may detect an action on the selection control to display the reflow view. The action may be an input by a user including a gesture input, a touch input, a keyboard input, a mouse input, or a similar one. The reflow view may be generated using the sections and displayed in a location associated with the sections within the displayed content. The reflow view may be transposed on the displayed content in the associated location.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
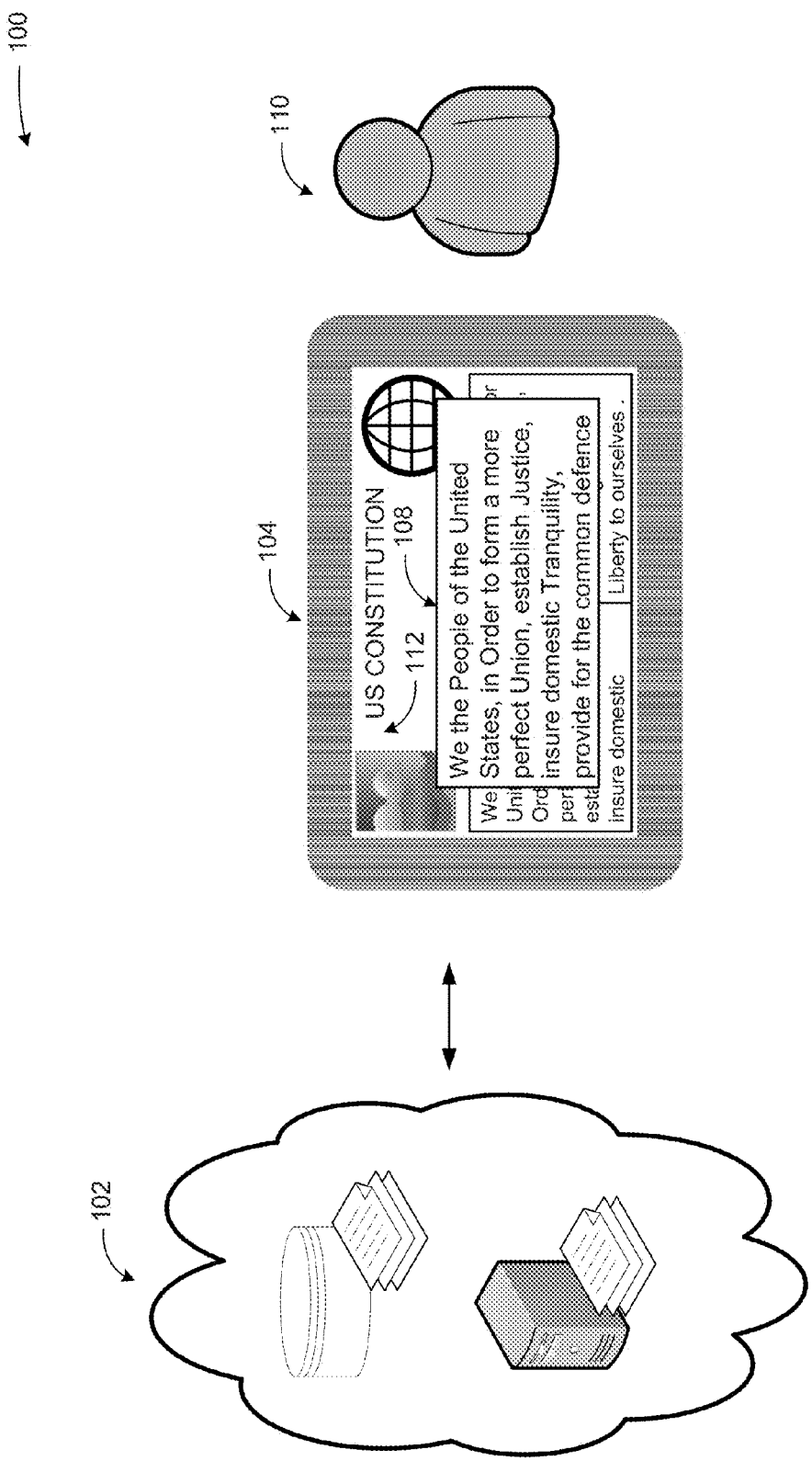
FIG. 1 illustrates an example concept diagram of presenting fixed format documents in a reflowed format according to some embodiments.

As briefly described above, fixed format documents may be presented in a reflowed format. A document reader application may identify sections of a displayed content having text and present a selection control to display the identified sections in a reflow view. In response to detecting an action on the selection control to display the reflow view, the reader application may generate and display the reflow view using the sections.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for presenting fixed format documents in a reflowed format. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example concept diagram of presenting fixed format documents in a reflowed format according to some embodiments. The components and environments shown in diagram 100 are for illustration purposes. Embodiments may be implemented in various local, networked, cloud-based and similar computing environments employing a variety of computing devices and systems, hardware and software.

A device 104 may present a reflow view 108 of displayed content 112. Displayed content 112 may be a fixed format document, which may include a document formatted to resemble paper productions such as pages of a paper book, a journal, and similar ones. A reflow view 108 may include text-based sections of the displayed content 112. The reflow view may be displayed in response to an action by a user 110 prompting the reader application to display the reflow view. The device 104 may recognize the action through its hardware capabilities, which may include a camera, a microphone, a touch-enabled screen, a keyboard, a mouse, and comparable ones.

The device 104 may communicate with external resources such as a cloud-hosted platform 102 to present the displayed content 112. An example may include retrieving a fixed format document from the external resources. The cloud-hosted platform 102 may include remote resources such as data stores and content servers. The reflow view 108 may be generated from displayed content 112 of the fixed format document.

Embodiments are not limited to implementation in a device 104 such as a tablet. The reader application, according to embodiments, may be a local application executed in any device capable of displaying the application. Alternatively, the reader application may be a hosted application such as a web service, which may execute in a server while displaying application content through a client user interface such as a web browser. In addition to a touch-enabled device 104, interactions with the displayed content 112 and reflow view 108 may be accomplished through other input mechanisms such as an optical gesture capture, a gyroscopic input device, a mouse, a keyboard, an eye-tracking input, and comparable software and/or hardware based technologies.

Figure 2:
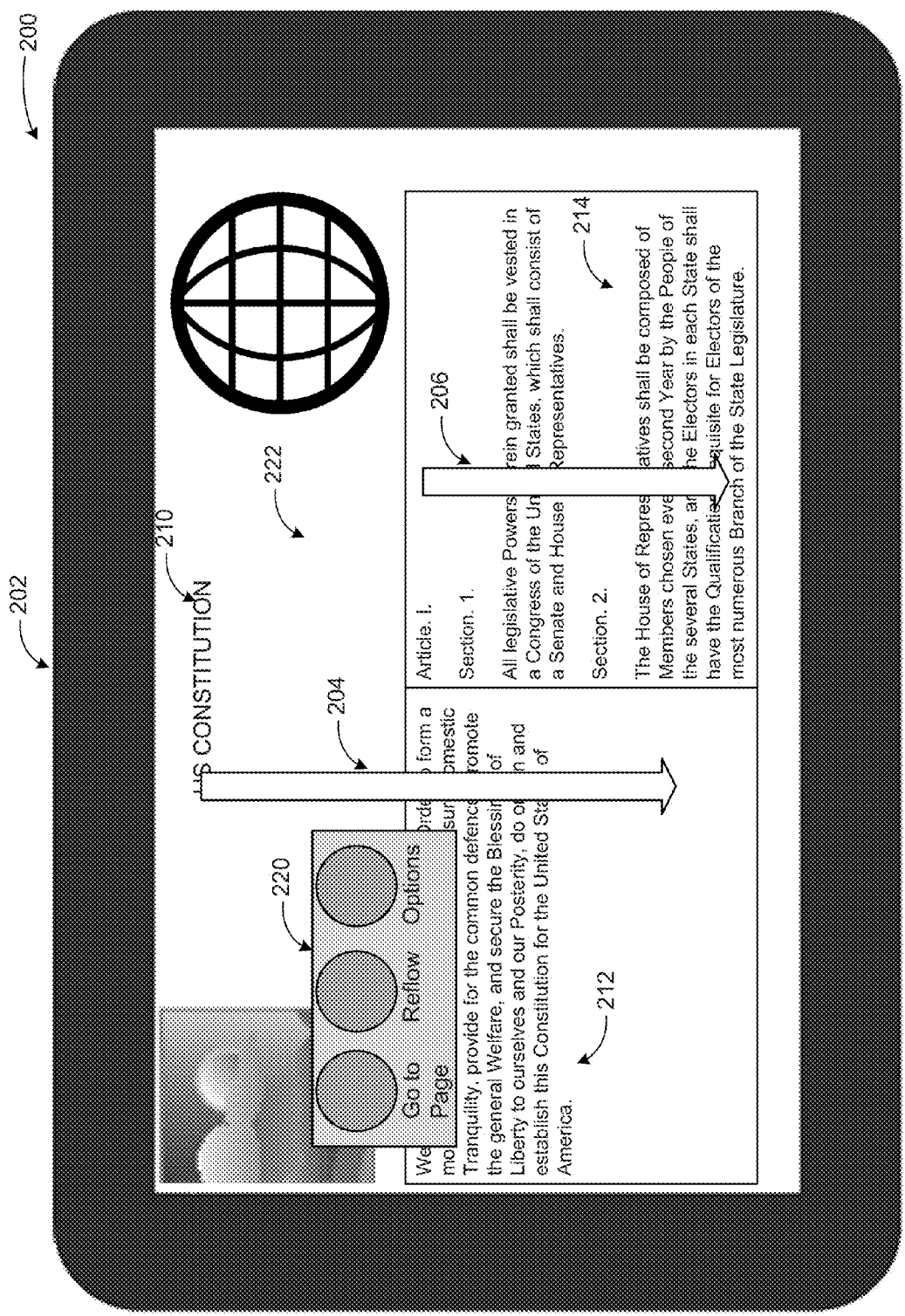
FIG. 2 illustrates an example of a reader application identifying sections of a fixed format document to generate a reflow view according to embodiments.

FIG. 2 illustrates an example of a reader application identifying sections of a fixed format document to generate a reflow view according to embodiments. Diagram 200 displays the reader application within a device 202 such as a tablet. The reader application may present a selection control 220 to determine a user's selection to present the displayed content 222 in a reflow view.

The reader application may identify sections of text within the displayed content 222. The reader application may utilize an optical character recognition (OCR) algorithm to extract sections containing text from the displayed content 222. Alternatively, sections of the displayed content 222 may be identified from tags encompassing sections of text. An example may include hypertext markup language (HTML) or extensible markup language (XML) tagged content. The reader application may identify tags associated with a title 210 and extract text of the title 210. In addition, the reader application may also identify tags associated with the body section 212 and the body section 214 and extract text associated with the body sections 212 and 214.

According to some embodiments, the reader application may identify text associated with the displayed content based on a classification of a primary section 204 and a secondary section 206. A correct sequence in which to display reflowed content in the reflow view may be determined based on the primary section 204 and the secondary section 206. The primary section 204 may include multiple sections of text including the title 210 and the body section 212. The body section 212 may include a table of text within the displayed content 222. The primary section 204 may be determined by retrieving text from the section identified as title 210 and text from the body section 212 adjacent to the left edge of a window pane presenting the displayed content 222. The title 210 and the body section 212 may be aggregated to generate the primary section 204.

The secondary section 206 may be generated by identifying a body section such as the body section 214 adjacent to the primary section 204. The reader application may display multiple body sections adjacent to the primary section 204. As such, multiple secondary sections may be generated from the identified adjacent body sections. In an example scenario, the reader application may present displayed content having two or more body sections horizontally adjacent to each other. Each body section adjacent to the first body section next to the left edge of the displayed content may be identified as secondary sections. Text from each none-primary body section may be retrieved and stored as secondary sections. After identification of the primary and secondary sections, the correct sequence may be determined for the reflowed content based on the aggregating and sequencing the primary and secondary sections into the reflow view.

Identification of primary and secondary sections is not limited to using the left edge of the displayed content 222 to associate the body section 212 with the primary section 204. Alternatively, the right edge of window pane presenting the displayed content 222 may be used to associate the body section 214 with a primary section. In yet other alternatives, the top edge or the bottom edge of a window pane presenting the displayed content 222 may be used to associate a section adjacent to either edge with the primary section and identify adjacent sections as secondary sections.

According to other embodiments, a selection control 220 may be displayed subsequent to identifying text-based sections of the displayed content 222. The selection control 220 may have a reflow view control to present a reflow view of the identified sections. The selection control 220 may also have a control to hide the selection or a displayed reflow view and re-display the displayed content 222. In addition, an options control on the selection control 220 may present options to alter attributes associated with the reflow view. In response to a selection of the options control, additional controls associated with the options control may be presented including a location selection of the reflow view. In addition, formatting selections including font type, font size, font color, and background color associated with the text of the reflow view may be presented in the additional options controls. Activation of the additional options controls may execute operations associated with the controls to alter associated attributes of the reflow view.

In addition, a user may be enabled to alter the primary and secondary section determination associated with the reflow view. In an example scenario, the user may be enabled to select an edge such as the top, the bottom, the left, and the right edge from which to identify the primary section adjacent to the edge. Subsequent body section(s) adjacent to the primary section may be determined to be secondary sections.

Figure 3:
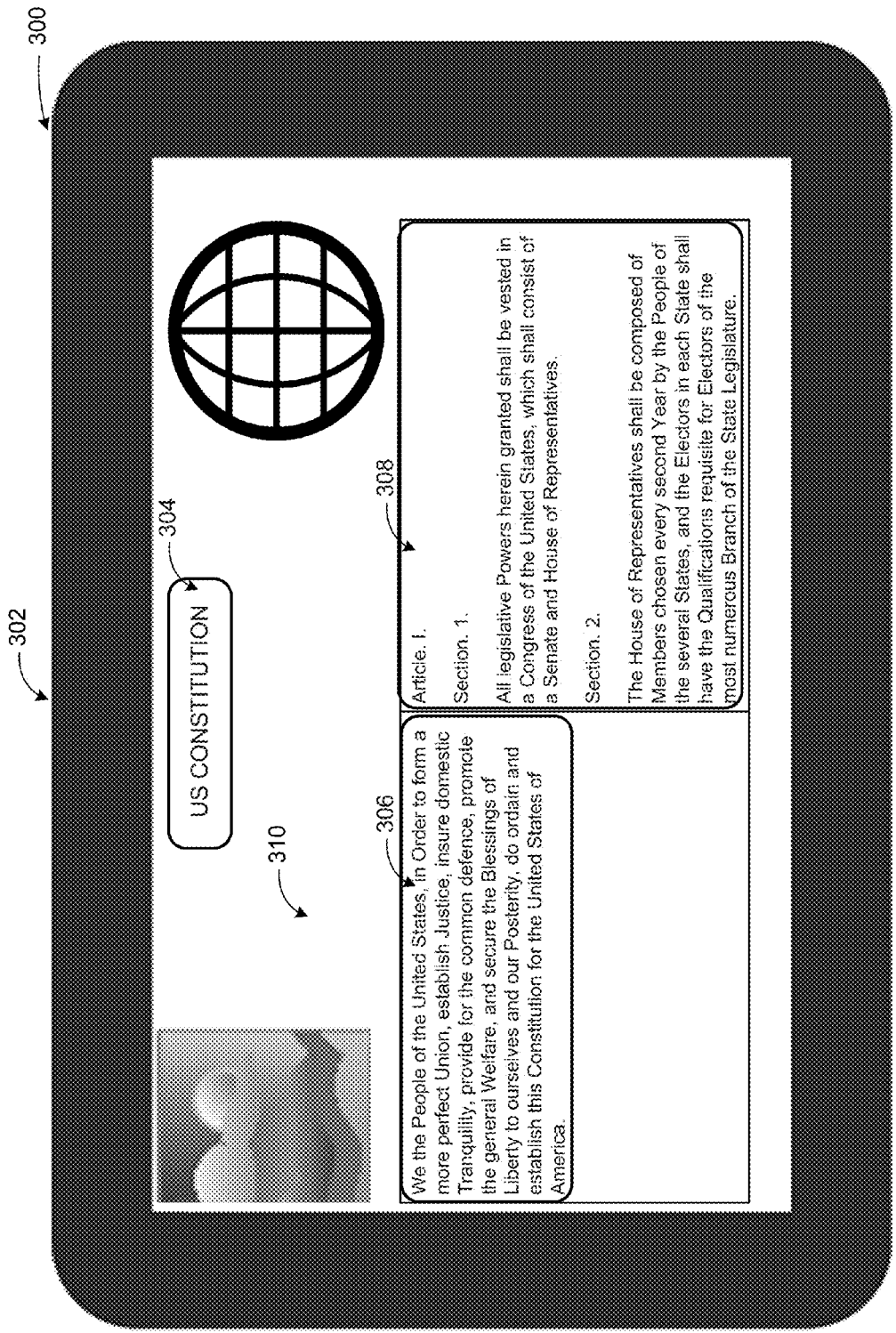
FIG. 3 illustrates another example of a reader application identifying sections of a fixed format document to generate a reflow view according to embodiments.

FIG. 3 illustrates another example of a reader application identifying sections of a fixed format document to generate a reflow view according to embodiments. Diagram 300 displays an example of identifying sections of text within the displayed content 310. A reader application may display content of a fixed format document within a device 302 such as a tablet. The displayed content may be processed by the reader application to identify sections of text to present in a reflow view.

According to some embodiments, the reader application may identify sections including a title section 304 and body sections 306 and 308. In an example scenario, the sections containing text may be identified based on tags used to format the displayed content 310. The text of the title section 304 may be encompassed using the following title tags such as <title> to indicate the beginning of the title and </title> to indicate the end of the title. The body sections may be encompassed using body tags such as <body></body> to indicate beginning and end of the body sections 306 and 308 respectively. Alternatively, other tags such as <table></table>, <column></column>, <row></row>, <cell></cell>, and similar ones may be used to identify a section of text within the displayed content 310. Examples of tags are not provided in a limiting sense; any tag may be used to identify a section containing text within the displayed content 310.

According to other embodiments, the reader application may determine a section containing text by searching for character separators within the identified text. In an example scenario, the reader application may use an OCR algorithm or a pattern recognition algorithm to identify text within the displayed content 310. Subsequently, the reader application may search for a line break character within the identified text. The reader application may use the line break character to indicate an end of a section, which includes text down to the line break character. Embodiments are not limited to use of line break character to determine end of a section; any predetermined character or character combination may be used to determine an end of a section. An example may include a paragraph header character, a tab character, and similar ones.

Identified sections may be characterized based on their classification including title and body. Location of the sections within the displayed content 310 may also be associated with identification of the sections. In an example scenario, a section of text at a top location of the displayed content 310 may be identified as the title section 304.

In addition, section identification may be labeled with a confidence factor value. The reader application may not display the selection control to present the reflow view if the confidence factor value for any identified section is below a predetermined threshold value. Alternatively, the reader application may display the selection control in response to a sum of the confidence factor values for all sections exceeding a predetermined threshold value. A confidence factor value based analysis may limit the reader to present sections of text associated with high value content such as title and body of the displayed content and not low value content such as menu and navigation controls.

Figure 4:
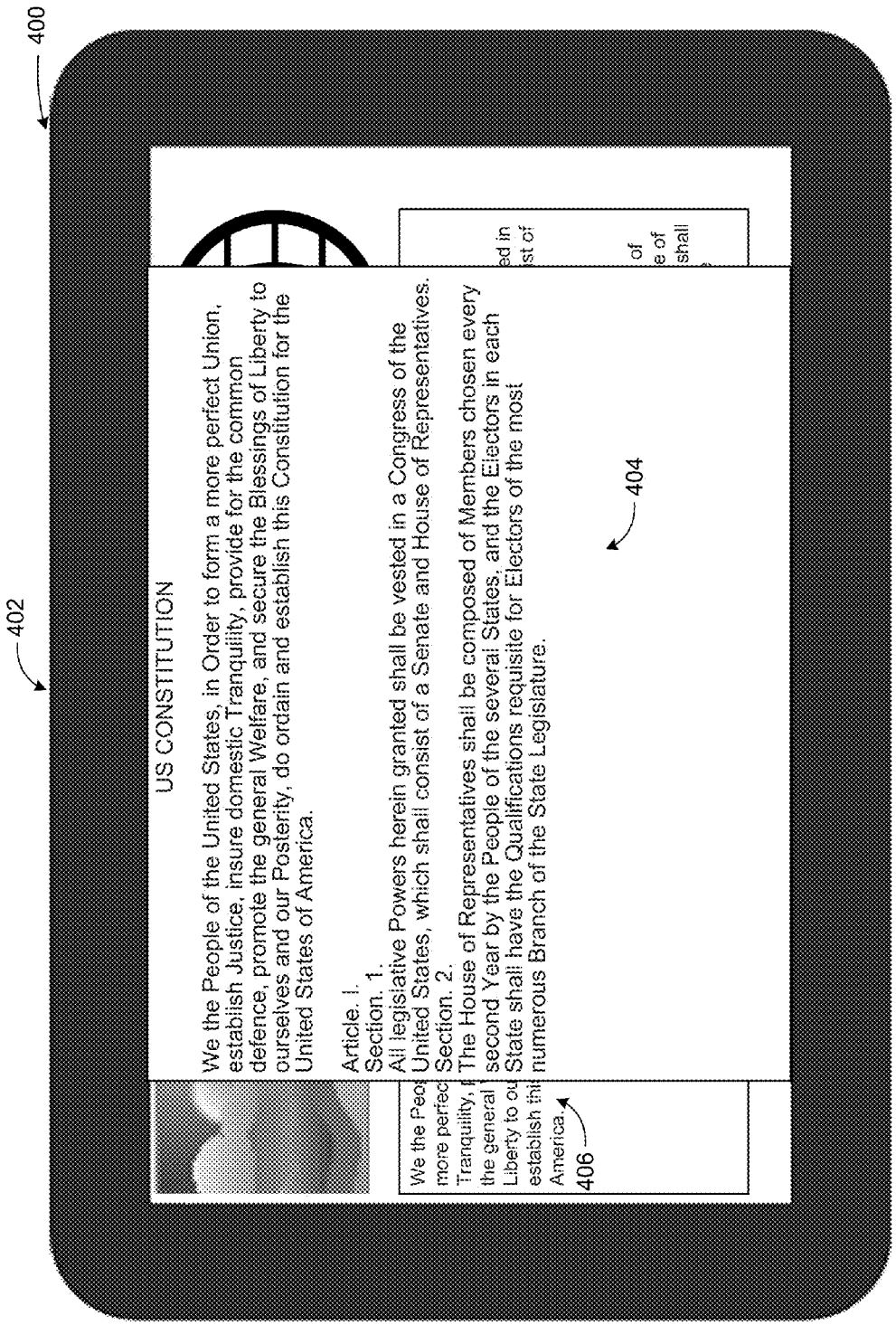
FIG. 4 illustrates an example reflow view presented by a reader application according to embodiments.

FIG. 4 illustrates an example reflow view presented by a reader application according to embodiments. Diagram 400 displays a device 402 providing a reflow view 404 of the displayed content 406 through a reader application.

The reader application may aggregate identified sections prior to displaying the text of the sections in the reflow view 404. Predetermined rules may be applied to the sections to aggregate the identified sections and sequence the identified sections into a correct sequence for the reflow view. In an example scenario, predetermined rules may be executed to replace multiple line break characters with a line break character, multiple tab characters may be replaced with a tab character, and multiple space characters may be replaced with a space character. A section identified as the title section may be placed above other sections. A primary section may be placed above secondary section(s). Order of the body sections may be determined based on localization preferences of the reader application. A reading direction setting may determine which section to place prior to subsequent sections. In an example scenario, in response to determining a left to right reading direction setting associated with a localization preference, the reader application may place a left section above a right section when aggregating the sections.

Location and size of the flow view may be automatically determined based on a screen size attribute of the device 402. The reader application may format the sections using a contrasting font when presenting within the reflow view. The contrasting font may include an increased size compared to a font of the displayed content 406. The contrasting font may also include another font type and font color compared to the displayed content 406. The reader application may employ a color scheme to contrast the reflow view 404 from the displayed content 406. For example, the font of text in the reflow view 404 may be a different color from a font color of the displayed content 406.

The location of the reflow view may be determined based on the location of the identified sections within the displayed content 406. The reflow view 404 may be transposed on top of the identified sections within the displayed content 406. The location of the reflow view 404 may be user adjustable. The reflow view 404 may also be displayed adjacent to an edge of the reader application. The location of the reflow view 404 may also persist across sessions of the reader application. The reflow view 404 may be presented at the same location within the reader application when generating the reflow view 404 for the displayed content of another fixed format document. In addition, the reflow view 404 may be adjusted to fit a screen size of the reader application. In an example scenario, the height of the reflow view may be extended to fit the height of the reader application while adjusting the width of the reflow view in proportion to the height adjustment without exceeding the width and the height of the reader application.

The example scenarios and schemas in FIG. 2 through 4 are shown with specific components, data types, and configurations. Embodiments are not limited to systems according to these example configurations. Presenting fixed format documents in a reflowed view may be implemented in configurations employing fewer or additional components in applications and user interfaces. Furthermore, the example schema and components shown in FIG. 2 through 4 and their subcomponents may be implemented in a similar manner with other values using the principles described herein.

Figure 5:
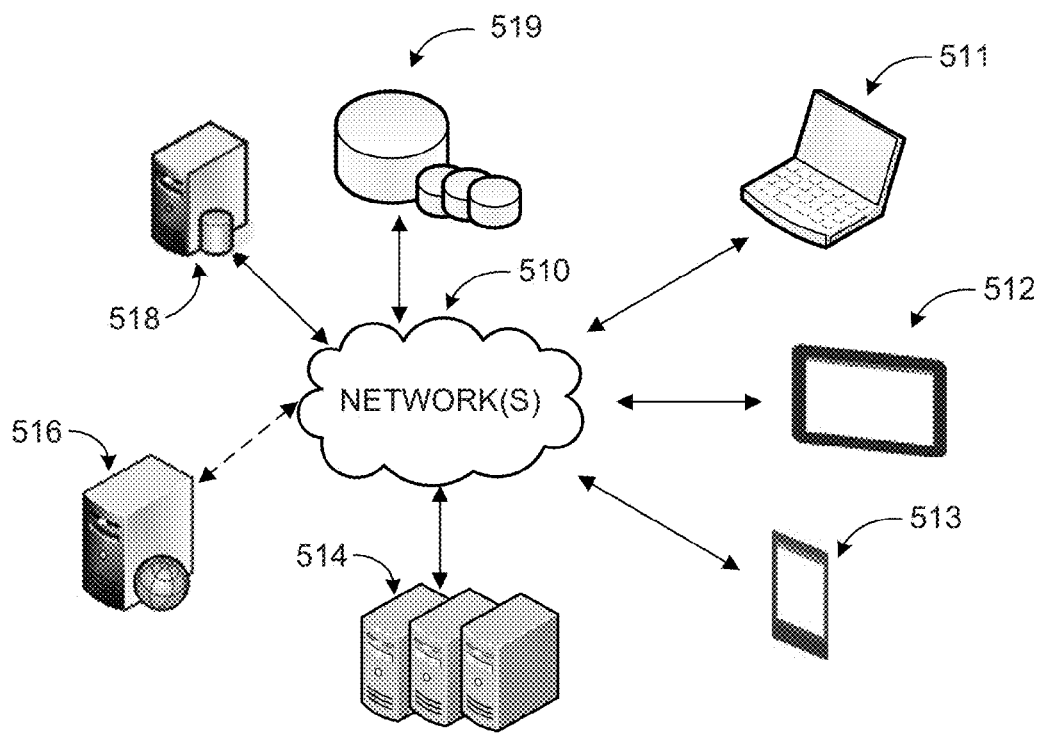
FIG. 5 is a networked environment, where a system according to embodiments may be implemented.

FIG. 5 is a networked environment, where a system according to embodiments may be implemented. Local and remote resources may be provided by one or more servers 514 or a single server (e.g. web server) 516 such as a hosted service. An application may execute on individual computing devices such as a smart phone 513, a tablet device 512, or a laptop computer 511 ('client devices') and retrieve content to display in a reflow view through network(s) 510.

As discussed above, a reader application may identify sections of a displayed content having text. The application may present a selection control to display a reflow view of the sections. In response to a user action to display the reflow view, the reader application may generate the reflow view using the sections and display the reflow view in a location associated with the sections within the displayed content. The reflow view may also be displayed in place of the displayed content. Client devices 511-513 may enable access to applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short-range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data resources, and data distribution systems may be employed to present fixed format documents in a reflowed format. Furthermore, the networked environments discussed in FIG. 5 are for illustration purposes only. Embodiments are not limited to the example applications, modules, or processes.

Figure 6:
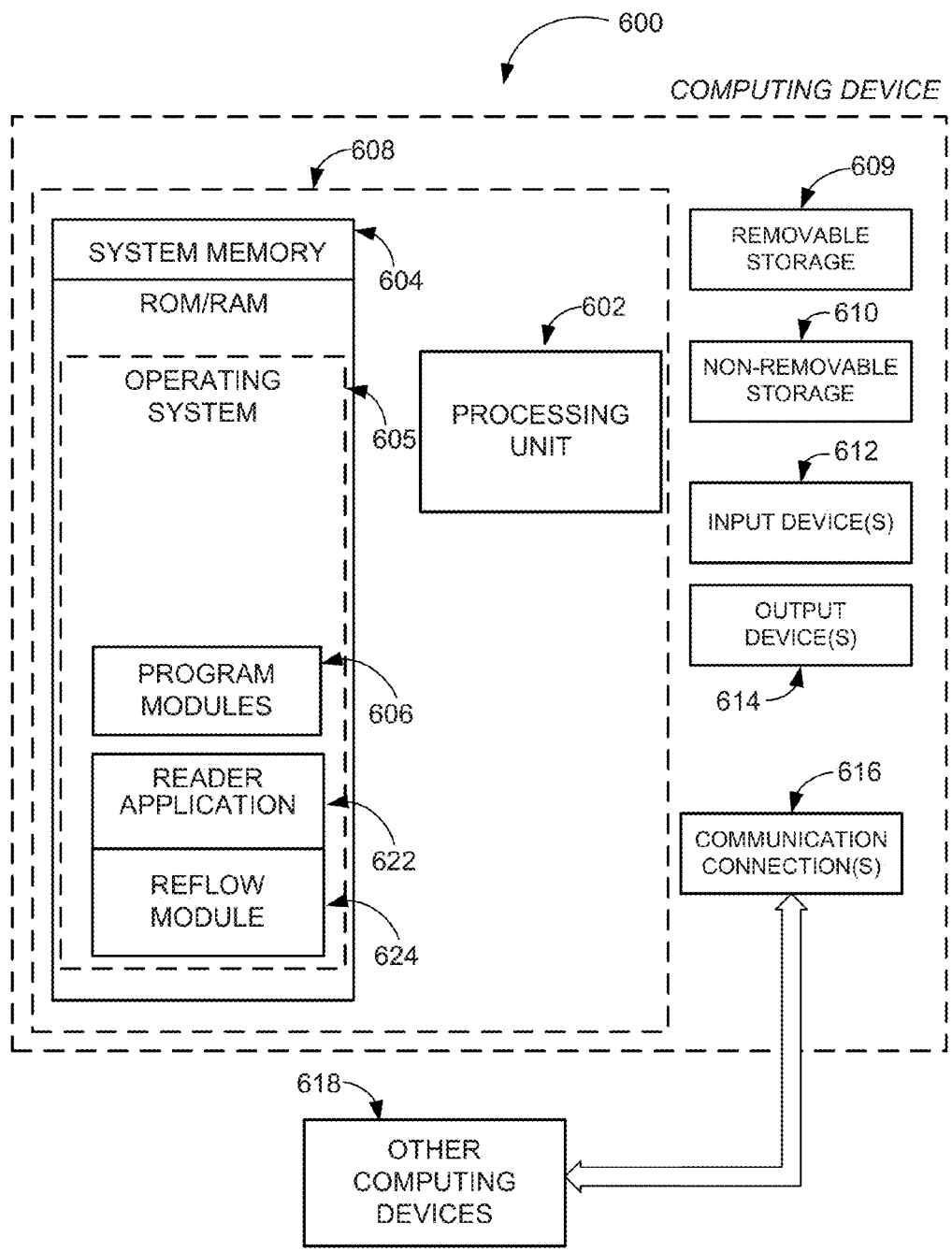
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® and WINDOWS PHONE® operating systems from MICROSOFT CORPORATION of Redmond, Wash. The system memory 604 may also include one or more software applications such as program modules 606, a reader application 622, and a reflow module 624.

A reader application 622 may identify sections of a displayed content having text. The reader application 622 may present a selection control to display a reflow view of the sections in a screen of the device 600, in proximity. The reflow module 624 may generate a reflow view of the sections in response to detecting an action on the selection control to display the reflow view. And, the reader application 622 may display the reflow view in a location associated with the sections within the displayed content. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
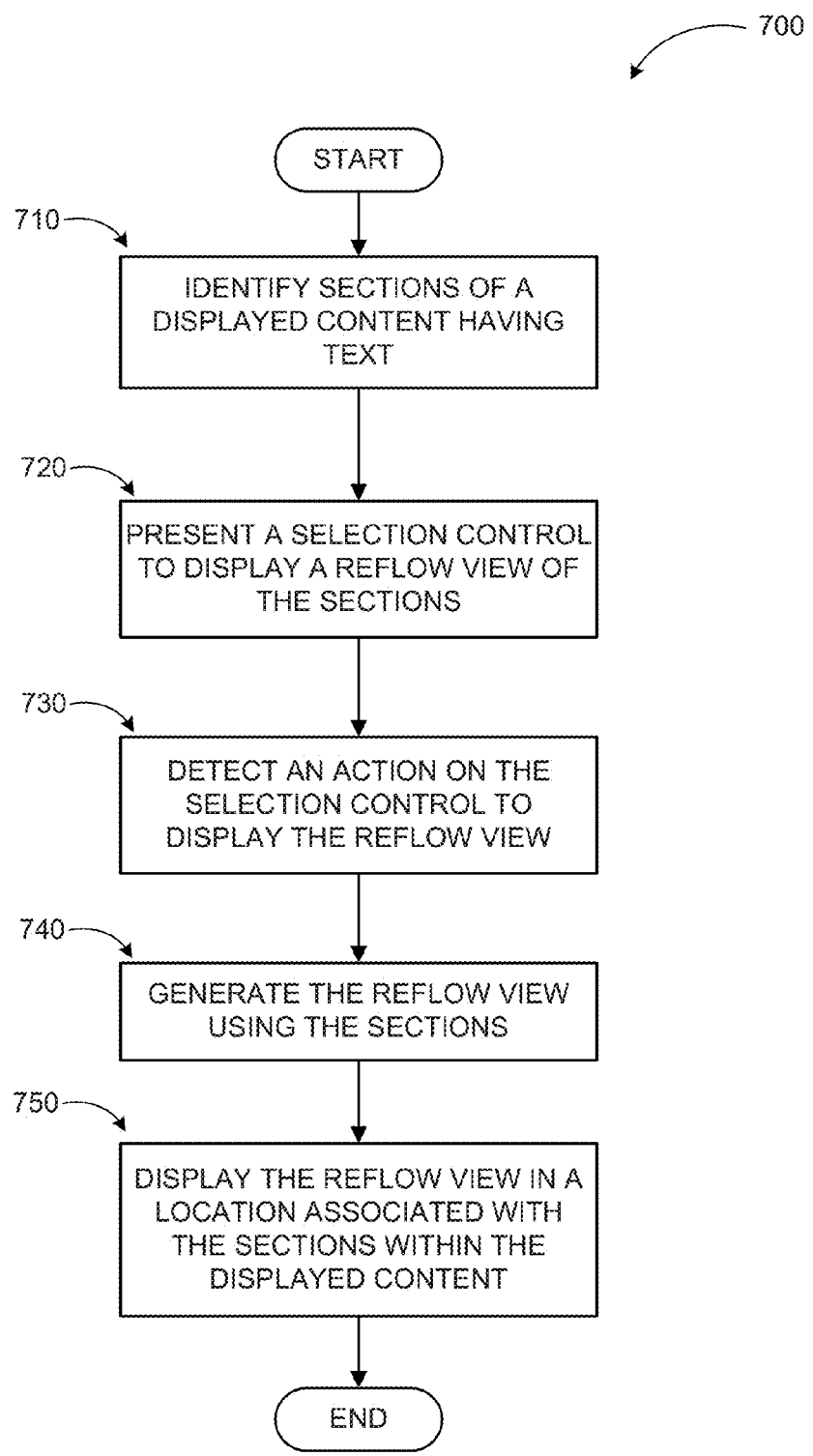
FIG. 7 illustrates a logic flow diagram for a process presenting fixed format documents in a reflowed format according to embodiments.

FIG. 7 illustrates a logic flow diagram for a process presenting fixed format documents in a reflowed format according to embodiments. Process 700 may be implemented by a reader application, in some examples.

Process 700 may begin with operation 710 where the reader application may identify sections of a displayed content having text. The sections may include a title section and body section(s). At operation 720, a selection control may be presented to display a reflow view of the sections. The selection control may have controls to go to the displayed document, display the reflow view, and present options associated with the reflow view. Next, the reader application may detect an action on the selection control to display the reflow view at operation 730. At operation 740, the reflow view may generated using the sections. The text of the sections may be aggregated, sequenced, and reformatted based on a screen size of the reader application. In some examples, the reflow view may be displayed in a location associated with the sections within the displayed content at operation 750. The reflow view may also be displayed in place of the displayed content.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Presenting fixed format documents in a reflowed format, according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for presenting fixed format documents in a reflowed format, the method comprising:
   identifying sections of a displayed content including text, wherein each of the sections are labeled with a confidence factor value;
   computing a sum value from the confidence factor value for each of the sections;
   presenting a selection control to display a reflow view of the sections in response to detecting the sum value exceed a threshold value;
   detecting an action on the selection control to display the reflow view;
   generating the reflow view using the sections by sequencing the sections into the reflow view; and
   displaying the reflow view in a location associated with the sections within the displayed content.

2. The method of claim 1, further comprising:
   identifying the sections using tags encompassing text of the sections including at least one of: a hypertext markup text language (HTML) and an extensible markup language (XML) tag.

3. The method of claim 1, further comprising:
   detecting a title section and at least one body section in the sections.

4. The method of claim 1, further comprising:
   classifying the sections as one of: a primary section and a secondary section.

5. The method of claim 4, further comprising:
   including a title section and at least one body section from the sections in the primary section.

6. The method of claim 5, further comprising:
   using the at least one body section adjacent to an edge of a pane presenting the displayed content in the primary section.

7. The method of claim 5, further comprising:
   using the at least one body section adjacent to one of: a top edge, a bottom edge, a right edge, and a left edge of a pane presenting the displayed content in the primary section.

8. The method of claim 5, further comprising:
   identifying one of the sections adjacent to the primary section as the secondary section.

9. The method of claim 8, further comprising:
   identifying a subsequent subset of the sections adjacent to the secondary section as other secondary sections.

10. The method of claim 1, further comprising:
    presenting a reflow view control and an options control.

11. The method of claim 10, further comprising:
    presenting additional options controls associated with at least one of: a location selection, a font type selection, a font size selection, a font color selection, and a background color selection of the reflow view in response to detecting another action selecting the options control.

12. A computing device for presenting fixed format documents in a reflowed format, the computing device comprising:
    a memory configured to store instructions; and
    a processor coupled to the memory, the processor executing a reader application in conjunction with the instructions stored in the memory, wherein the application is configured to:
    identify sections of a displayed content including text, wherein each of the sections are labeled with a confidence factor value;
    compute a sum value from the confidence factor value for each of the sections;
    detect a title section and at least one body section in the sections;
    present a selection control to display a reflow view of the sections in response to detecting the sum value exceed a threshold value;

detect an action on the selection control to display the reflow view;

generate the reflow view using the sections; and display the reflow view in a location associated with the sections within the displayed content.

13. The computing device of claim 12, wherein the application is further configured to:

aggregate the sections.

14. The computing device of claim 13, wherein the application is further configured to:

execute a set of predetermined rules to aggregate the sections including at least one of: replace a plurality of line break characters with a line break character, replace a plurality of space characters with a space character, and replace a plurality of tab characters with a tab character.

15. The computing device of claim 13, wherein the application is further configured to:

place the title section above the at least one body section.

16. The computing device of claim 13, wherein the application is further configured to:

determine an order of multiple body sections based on a localization preference of the reader application.

17. The computing device of claim 16, wherein the application is further configured to:

place a left section of the multiple body sections above a right section of the multiple body sections in response to determining a left to right reading direction setting associated with the localization preference.

18. A computer-readable memory device with instructions stored thereon for presenting fixed format documents in a reflowed format, the instructions comprising:

identifying sections of a displayed content including text, wherein each of the sections are labeled with a confidence factor value;

computing a sum value from the confidence factor value for each of the sections;

detecting a title section and at least one body section in the sections;

presenting a selection control to display a reflow view of the sections in response to detecting the sum value exceed a threshold value;

detecting an action on the selection control to display the reflow view;

generating the reflow view using the sections;

aggregating the sections by placing the title section above the at least one body section; and displaying the reflow view in a location associated with the sections within the displayed content.

19. The computer-readable memory device of claim 18, wherein the instructions further comprise:

assigning a font color of the displayed content to a background color of the reflow view to contrast the reflow view from the displayed content.

20. The computer-readable memory device of claim 18, wherein the instructions further comprise:

transposing the reflow view over the displayed content in the location associated with the sections within the displayed content; and using a contrasting font within the reflow view having an increased size compared to a font of the displayed content.

* * * * *